UNITED STATES PATENT OFFICE.

JOSEPH VAN RUYMBEKE, OF CHICAGO, ILLINOIS, ASSIGNOR TO THE NATIONAL CHEMICAL AND FERTILIZER COMPANY, OF SAME PLACE.

PHOSPHATIC FERTILIZER.

SPECIFICATION forming part of Letters Patent No. 453,750, dated June 9, 1891.

Application filed June 20, 1890. Serial No. 356,137. (No specimens.)

*To all whom it may concern:*

Be it known that I, JOSEPH VAN RUYMBEKE, a subject of the King of Belgium, residing at Chicago, in the county of Cook and State of Illinois, have invented a certain new and useful Improvement in Phosphatic Fertilizers, which is fully set forth in the following specification.

The object of my present invention is to obtain a dry granulated merchantable fertilizer from a compound of phosphate material containing soluble phosphoric acid derived from iron or alumina phosphates and "stick," which contains more or less nitrogen.

Iron and alumina phosphates have been treated heretofore with acids to produce soluble phosphates. This ordinary acid treatment is well known and need not be described in this connection; but the product obtained by this treatment is pasty and sticky, and even when dried is deliquescent, unless the drying-heat is carried high enough to transform the material into metaphosphates. Hence the soluble phosphates obtained by the ordinary acid treatment are unsuitable for merchantable fertilizers without some further transformation.

It is well known that stick is produced by concentrating tank-water which has been separated from the solid matter in suspension, which solid matter is known as "tankage." Tank-water is obtained by the rendering of meats, fish, and other fatty matter, and contains the extract of these substances and the gelatinous material resulting from the prolonged action of water upon the muscle, cartilage, and bone of the material treated. The solution is first mechanically separated from the said solids in suspension, and this solution is what is known as "tank-water." This solution while still hot is then evaporated to at least 22° Baumé. The product is what is known as "stick," and is viscid and deliquescent. The entire operation must be performed without permitting the liquid to cool, in order to prevent decomposition, for fermentation sets in almost immediately upon the liquid becoming cool. If the solid matter in suspension, which is known as "tankage," is not separated from the solution and the two together are partially dried, so as to contain not more than fifty per cent. of water, the product will be only very slightly sticky, because the tankage is absolutely non-viscid and non-deliquescent, and this solid matter, called "tankage," is generally in the proportion of about three to one to the matter held in solution. Therefore a treatment adapted to the tankage product would not necessarily be adapted to the curing of stick, on account of the different nature of the two substances mentioned above. Furthermore, stick prepared as above explained, can be kept almost indefinitely without undergoing any decomposition and consequent loss of nitrogen. On the other hand, the tankage mixture mentioned above, evaporated to about fifty per cent. of water, will putrefy rapidly, this process, in fact, commencing as soon as it is cooled off. This material is of course unsuitable for fertilizers unless its sticky deliquescent nature is cured. Stick is not cured by the acid salts of iron or alumina, such as are produced by the ordinary acid treatment of phosphatic rock mentioned above. I have discovered, however, that if a mixture of stick and the said pasty acid phosphate of iron or alumina is heated until the mass turns black it will granulate, and when cooled may be easily pulverized, and is dry and merchantable. The degree of heat necessary for this transformation is about 212° Fahrenheit; but it occurs even below this and without any perceptible loss of moisture or products of decomposition. The temperature may be increased beyond 212° Fahrenheit without injury, but it is not necessary.

The proportions of stick and acid phosphate may vary considerably. The process is operative with five hundred pounds of stick to three thousand pounds of the acid phosphate, and also with two thousand pounds of stick to six hundred pounds of the phosphate, and practically with any variation between these extremes. The nature of the product of course varies with the proportions. In the first instance given above the compound will contain a large percentage of soluble phosphoric acid and a small percentage of nitrogen, while in the last instance this relation will be reversed, and so this relation may be varied indefinitely between the two extremes.

The proportions will be governed somewhat, also, by the nature of the ingredients, depending upon the specific gravity of the stick and the percentage of phosphoric acid in the natural rock. Preferably the ingredients are thoroughly mixed together in a suitable receptacle, the mixture assuming the form of a thick paste. This pasty material is then placed in a revolving drum or any other suitable receptacle to which heat may be readily applied and heated up to about 212° Fahrenheit, or until the mass has turned black. The result is a dry granulated product in merchantable form for fertilizing purposes.

Having thus described my invention, what I claim as new, and desire to secure by Letters Patent, is—

A fertilizer composed of iron or alumina acid phosphates and stick thoroughly mixed together and subjected to the action of heat at about or above 212° Fahrenheit until it assumes a black color, substantially as described.

JOSEPH VAN RUYMBEKE.

Witnesses:
CARRIE FEIGEL,
A. M. BEST.